(No Model.)  2 Sheets—Sheet 1.
D. LUMBERT.
CRANBERRY GATHERER.
No. 289,846. Patented Dec. 11, 1883.
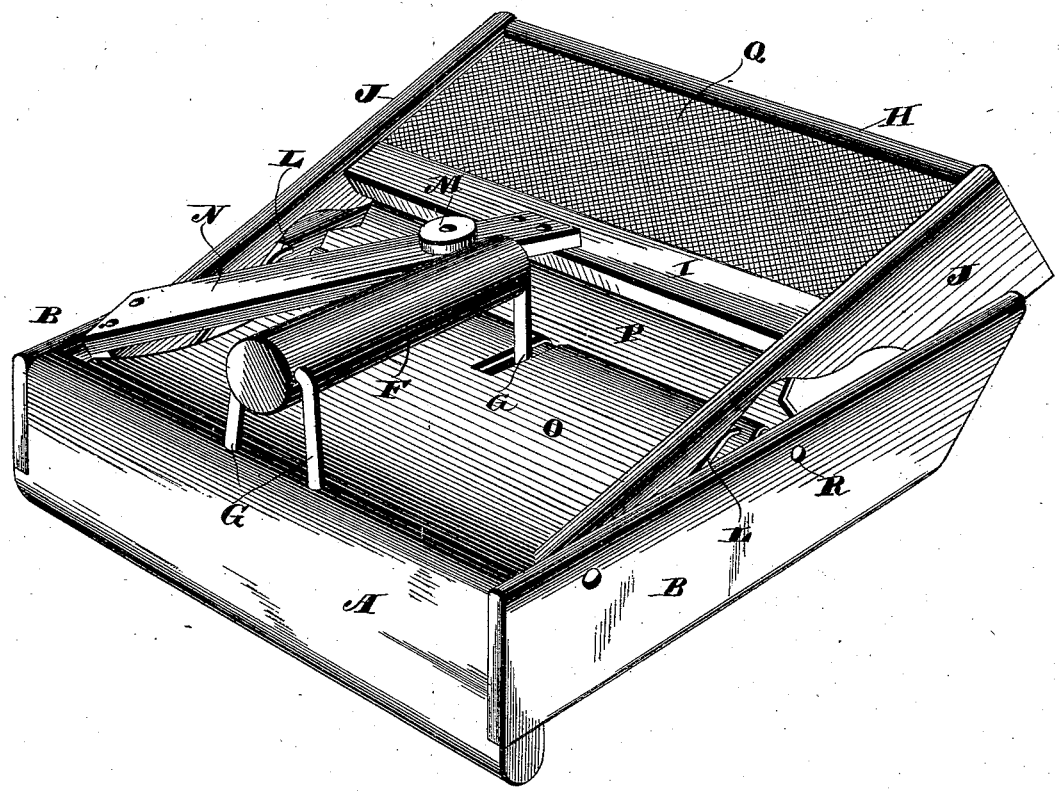
WITNESSES
INVENTOR (No Model.) 2 Sheets—Sheet 2.
D. LUMBERT.
CRANBERRY GATHERER.
No. 289,846. Patented Dec. 11, 1883.
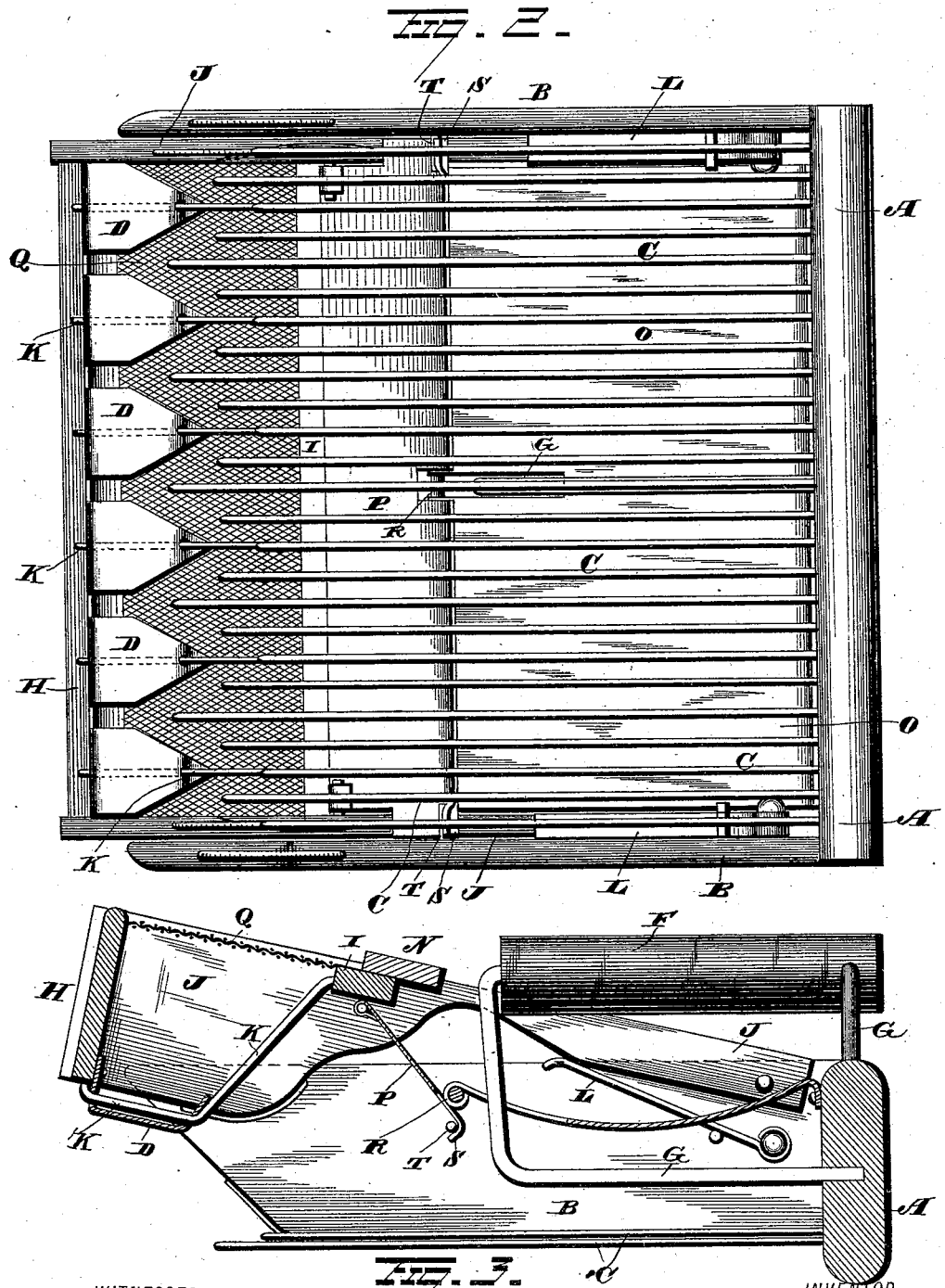

UNITED STATES PATENT OFFICE.

DANIEL LUMBERT, OF CENTREVILLE, MASSACHUSETTS.

CRANBERRY-GATHERER.

SPECIFICATION forming part of Letters Patent No. 289,846, dated December 11, 1883.

Application filed May 11, 1883. (No model.)

*To all whom it may concern:*

Be it known that I, DANIEL LUMBERT, of Centreville, in the county of Barnstable and State of Massachusetts, have invented certain new and useful Improvements in Devices for Gathering Cranberries; and I do hereby declare the following to be a full, clear, and exact description of the invention, such as will enable others skilled in the art to which it pertains to make and use the same.

My invention relates to an improvement in fruit-gatherers, and more particularly to that class thereof which are designed to be used in the harvesting of cranberries, the object of the invention being to produce a device of this character which shall combine cheapness and simplicity of construction with durability and efficiency in use.

In the accompanying drawings, Figure 1 is a view in front elevation of a device for gathering cranberries, said device being constructed in accordance with my invention. Fig. 2 is a plan view thereof, and Fig. 3 is a view of the device in vertical longitudinal section.

The device consists, essentially, of a receptacle for the vines and berries, and of a stripper, the function of which is to remove the berries from the vines. The receptacle aforesaid consists of a cross-piece, A, to which the rear ends of the parallel side pieces, B, are attached. The bottom of the receptacle is composed of a series of rods, C, the inner ends of which are inserted in the lower edge of the cross-piece A. These rods, the outer ends of which are pointed, are of several lengths, being grouped in such manner as to extend into and fill up the spaces between the strippers D. It will also be observed of the rods that they are located in different planes, to increase the extent of the openings between them. The device is operated by a handle, F, the same being secured to a wire frame, G, attached to the cross-piece A.

The frame of the stripper consists, essentially, of an end piece, H, a cross-piece, I, and two arms, J, the rear ends of which are pivoted to the inner faces of the side pieces, B. A series of flat sheet-metal strippers, D, are secured to and extend rearwardly from the end piece, H, said strippers being formed independently, or from a common blank, as herein shown. The forward and rear ends of the strippers are perforated to receive the wires K, by which they are supported and held in place, the opposite ends of said wires being respectively attached to the end piece, H, and to the cross-piece I. The stripper is held in its normally-elevated position, in which it is shown in Figs. 1 and 2 of the drawings, by means of springs L, attached to the inner faces of the side pieces, B, and arranged to impinge on the lower faces of the arms J. The stripper is depressed against the force of these springs by means of a button, M, mounted upon a diagonal strip, N, the ends of which rest upon the cross-piece I, and upon the rear end of one of the arms J. The berries are prevented from escaping from the device by means of a shield, O, an apron, P, and a netting, Q, of wire. The forward and rear ends of the shield are respectively attached to the cross-piece A and to a rod, R, uniting the side pieces, B, while on the other hand the netting Q is stretched between the end piece, H, and the cross-piece I of the stripper. The apron P consists of a piece of sheet metal, the forward end of which is hinged to the arms J, its rear end being provided with hooked extensions S, arranged to slide upon and to be engaged with pins T, projecting from the inner faces of the side pieces, B. The device is operated by pressing it down upon the cranberry-vines, and then pushing it forward to engage them with the rods C. This done, the stripper is depressed and the device drawn away from the vines, with the effect of stripping the berries therefrom. The berries so gathered are then emptied into a suitable receptacle by allowing the stripper to resume its normal position, and by tipping the device to cause the berries to run out.

It is obvious that the device herein shown may be modified in some respects without departing from the invention. The strippers C may, for instance, be substituted by wires bent into their outline, while the arms J of the stripper may be pivoted to the outer faces of the side pieces, B, or to the cross-piece A. The springs O may be variously arranged and still perform their functions, and, if desired, the apron may be replaced by a piece of fabric. I would therefore have it understood that I do not limit myself to the exact construction shown and described, but that I consider myself at liberty to make such slight changes and alterations as fairly fall within the spirit and scope of my invention.

Having fully described my invention, what I claim as new, and desire to secure by Letters Patent, is—

1. In a device for gathering cranberries, the combination, with a receptacle and a stripper constructed substantially as described, and closed to prevent the escape of berries, of a movable apron arranged to close the opening between the said receptacle and stripper, substantially as described.

2. In a device for gathering cranberries, the combination, with a receptacle and a stripper constructed substantially as described, and closed to prevent the escape of berries, of a metallic apron arranged to close the space between the receptacle and stripper, and to adjust itself to the position of the latter, substantially as set forth.

3. In a device for gathering cranberries, the combination, with a receptacle constructed substantially as described, and provided with a shield, of a stripper closed to prevent the escape of berries, and a movable apron arranged to close the opening between the shield of the receptacle and the rear end of the stripper, substantially as set forth.

4. In a device for gathering cranberries, the combination, with a receptacle and a stripper constructed substantially as described, of the described strippers having the forward and rear ends perforated to receive the wires by which they are supported in place, substantially as set forth.

In testimony whereof I have signed this specification in the presence of two subscribing witnesses.

DANIEL LUMBERT.

Witnesses:
EDWARD B. HINCKLEY,
GEORGE H. HINCKLEY.